(12) United States Patent
Chae et al.

(10) Patent No.: US 10,913,376 B2
(45) Date of Patent: Feb. 9, 2021

(54) PUMPING DEVICE FOR SEAT OF VEHICLE

(71) Applicant: Hyundai Dymos Incorporated, Chungcheongnam-do (KR)

(72) Inventors: Soo Young Chae, Gyeonggi-do (KR); Young Sun Lee, Seoul (KR)

(73) Assignee: Hyundai Dymos Incorporated, Chungcheongnam-do (KR)

( * ) Notice: Subject to any disclaimer, the term of this patent is extended or adjusted under 35 U.S.C. 154(b) by 103 days.

(21) Appl. No.: 16/199,941

(22) Filed: Nov. 26, 2018

(65) Prior Publication Data

US 2019/0193596 A1 Jun. 27, 2019

(30) Foreign Application Priority Data

Dec. 26, 2017 (KR) .................. 10-2017-0180220

(51) Int. Cl.
*B60N 2/16* (2006.01)

(52) U.S. Cl.
CPC ............. *B60N 2/167* (2013.01); *B60N 2/168* (2013.01); *B60N 2/169* (2013.01)

(58) Field of Classification Search
None
See application file for complete search history.

(56) References Cited

U.S. PATENT DOCUMENTS

| 9,469,219 | B2 * | 10/2016 | Kim | ................... | B60N 2/22 |
| 2015/0314709 | A1 * | 11/2015 | Kim | ................ | B60N 2/1864 |
| | | | | | 297/344.12 |
| 2018/0094679 | A1 * | 4/2018 | Kaku | ................ | F16D 63/008 |

FOREIGN PATENT DOCUMENTS

| KR | 20-0420208 Y1 | 6/2006 |
| KR | 10-0722849 B1 | 5/2007 |
| KR | 10-0784620 B1 | 12/2007 |
| KR | 10-2011-0054714 A | 5/2011 |
| KR | 10-2015-0114054 A | 10/2015 |
| KR | 10-1607203 B1 | 3/2016 |

\* cited by examiner

*Primary Examiner* — Timothy Hannon
(74) *Attorney, Agent, or Firm* — Mintz Levin Cohn Ferris Glovsky and Popeo, P.C.; Peter F. Corless

(57) ABSTRACT

Disclosed is a pumping device for a seat of a vehicle, the device including: a cam mechanism rotating along with a lever; a clutch mechanism receiving power from the cam mechanism; a housing accommodating the cam mechanism and the clutch mechanism therein; a brake mechanism accommodated in the housing to receive power from the clutch mechanism, and configured such that boss portions protrude along an outer circumferential surface thereof, outer end sides of the boss portions face an inner circumferential surface of the housing, and a pressing portion protruding from the clutch mechanism is disposed between a boss portion and a neighboring boss portion; and a brake roller provided at opposite sides of each of the boss portions of the brake mechanism to be disposed between the boss portion and the pressing portion.

5 Claims, 4 Drawing Sheets

<A - A>

PUMPING DEVICE FOR SEAT OF VEHICLE

CROSS REFERENCE TO RELATED APPLICATION

The present application claims priority to Korean Patent Application No. 10-2017-0180220, filed Dec. 26, 2017, which is incorporated herein by reference.

BACKGROUND OF THE INVENTION

Field of the Invention

The present invention relates to a pumping device for a seat of a vehicle, the pumping device minimizes noise and wear by preventing a brake mechanism from being brought into contact with a housing.

Description of the Related Art

A conventional pumping device is a device that is attached to a seat such that a seat occupant manually adjusts the height of the seat cushion to match the seat occupant's body shape.

If the seat occupant operates a lever handle installed on the side of the seat cushion clockwise or counterclockwise, the operating force of the lever handle is transmitted to the link mechanism through the seat pumping device to raise or lower the seat cushion in accordance with the operating direction of the lever handle so that the height of the seat cushion can be adjusted.

FIG. 1 is a component diagram showing a conventional seat pumping device. Referring to FIG. 1, a seat pumping device for a vehicle includes: a lever bracket 100 configured to be integrally rotated with a lever handle (not shown) that is operated by a user; a return spring guide 110 in which a return spring 112 providing a restoring force to the lever bracket 100 is accommodated; a housing 120 formed in a drum 122 shape and provided inside a seat cushion (not shown); a clutch mechanism 130 accommodated in the housing 120 and configured to receive a user's rotational operating force through the lever bracket 100 and transmit the same; a brake mechanism 140 configured to cut off torque reversely input and maintain the adjusted height of the seat cushion; and a housing cover 150 coupled to a side of the housing 120 to cover the housing 120.

The return spring guide 110 may be provided with a donut-shaped groove on a side surface to receive the return spring 112.

The clutch mechanism 130 includes: a clutch cam 134 accommodated in a clutch drum 132; a plurality of clutch rollers 136 provided between an outer circumferential surface of the clutch cam 134 and an inner circumferential surface of the clutch drum 132; and a clutch spring 138 configured to elastically support the clutch rollers 136.

On a side surface of the clutch cam 134, a plurality of coupling protrusions 135 are provided spaced apart from each other at a predetermined interval in a circumferential direction. In the middle of a bottom surface 124 of the drum 122 of the housing 120, a through-hole 126 is formed such that the coupling protrusions 135 of the clutch cam 134 are inserted thereinto. The lever bracket 100 includes a coupling drum 104 protruding in an axial direction.

The coupling protrusions 135 of the clutch cam 134 protrude through the through-hole 126 of the housing 120 and are inserted into assembly-holes formed in the bottom surface of the coupling drum 104 of the lever bracket 100 and welded to be integrally coupled with the lever bracket 100.

The lever arm 102, which is provided in the lever bracket 100 and is bent in the axial direction, is elastically supported by the return spring 112 of the return spring guide 110 in the circumferential direction, such that when the lever bracket 100 is rotated in response to the lever handle operation by the user, the return spring 112 is compressed by the lever arm 102 of the lever bracket 100 and provides an elastic restoring force to the lever bracket 100.

Meanwhile, the clutch drum 132 is provided with a wedge portion 133 protruding toward the brake mechanism 140 side. The brake mechanism 140 includes: a brake drum 142 provided with a T-shaped protrusion 143 on an outer circumferential surface thereof; and a plurality of brake rollers 144 arranged between the wedge portion 133 and the protrusion 143 along the circumferential direction. Thereby, it is possible to cut off torque reversely input and maintain the adjusted height of the seat cushion.

Herein, since the lever bracket 100, the housing 120, and the clutch cam 134 rotate about the same axis, and the clutch drum 132 and the brake mechanism 140 rotate about different axes, when the assembly is not normally performed or the brake mechanism 140 and the housing 120 are misaligned due to an external impact, the brake drum 142 rubs against the inner circumferential surface of the drum 122 of the housing 120, causing noise and wear.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a pumping device for a seat of a vehicle, in which friction between a brake mechanism and a housing is prevented, whereby it is possible to prevent noise and durability degradation.

In order to achieve the above object, according to some aspect of the present invention, there is provided a pumping device for a seat of a vehicle, the pumping device including: a cam mechanism rotating along with a lever; a clutch mechanism receiving power from the cam mechanism; a housing accommodating the cam mechanism and the clutch mechanism therein; a brake mechanism accommodated in the housing to receive power from the clutch mechanism, and configured such that a plurality of boss portions protrude along an outer circumferential surface thereof, outer end sides of the boss portions face an inner circumferential surface of the housing, and a pressing portion protruding from the clutch mechanism is disposed between a boss portion and a neighboring boss portion; and a brake roller provided at opposite sides of each of the boss portions of the brake mechanism to be disposed between the boss portion and the pressing portion, and configured such that an outermost point thereof is disposed outward more than the outer end sides of the boss portions based on a central axis of the brake mechanism, and the outermost point is brought into contact with the inner circumferential surface of the housing.

Each of the boss portions may be configured to have a protruding height from the outer circumferential surface of the brake mechanism smaller than a diameter of the brake roller.

The brake roller may be configured to have a diameter larger than a protruding height of the boss portions from the outer circumferential surface of the brake mechanism.

When the brake roller is pressed by the pressing portion or the boss portion to move along the outer circumferential surface of the brake mechanism, the outermost point of the brake roller may be always brought into contact with the inner circumferential surface of the housing, and an outermost point of the boss portion may maintain a gap with the inner circumferential surface of the housing.

The outer circumferential surface of the brake mechanism may be provided with a plurality of inclined surfaces configured to be gradually away from the central axis of the brake mechanism as being gradually away with respect to the boss portions in a circumferential direction, and each of the plurality of inclined surfaces may be configured to have an angle such that in a state where the brake roller is brought into contact with the inclined surface and the boss portion, the outermost point of the brake roller is brought into contact with the inner circumferential surface of the housing.

According to a pumping device for a seat of a vehicle configured as described above, it is advantageous in that although dimensional tolerance is generated or the displacement between the brake mechanism and the housing is generated by the external force, the friction between the boss portion of the brake mechanism and the housing is prevented, whereby it is possible to prevent friction noise, brake mechanism insertion, and durability degradation of the brake mechanism, and ultimately, it is possible to improve the pumping device's merchantability.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, pumping device for a seat of a vehicle according to an exemplary embodiment of the present invention will be described in detail with reference to the accompanying drawings.

Figure 1:
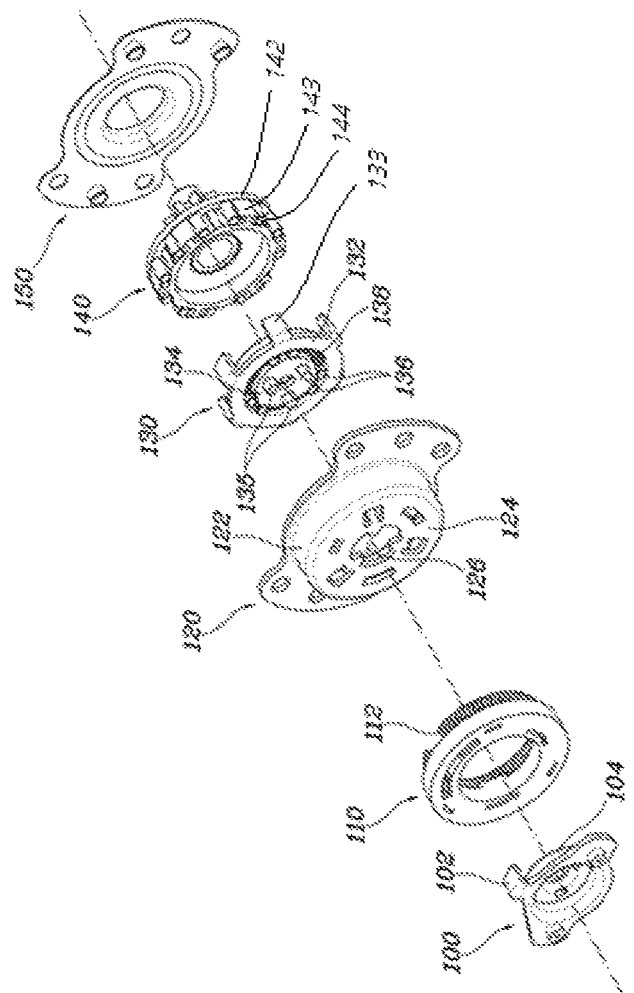
FIG. 1 is a component diagram showing a conventional seat pumping device.
Figure 2:
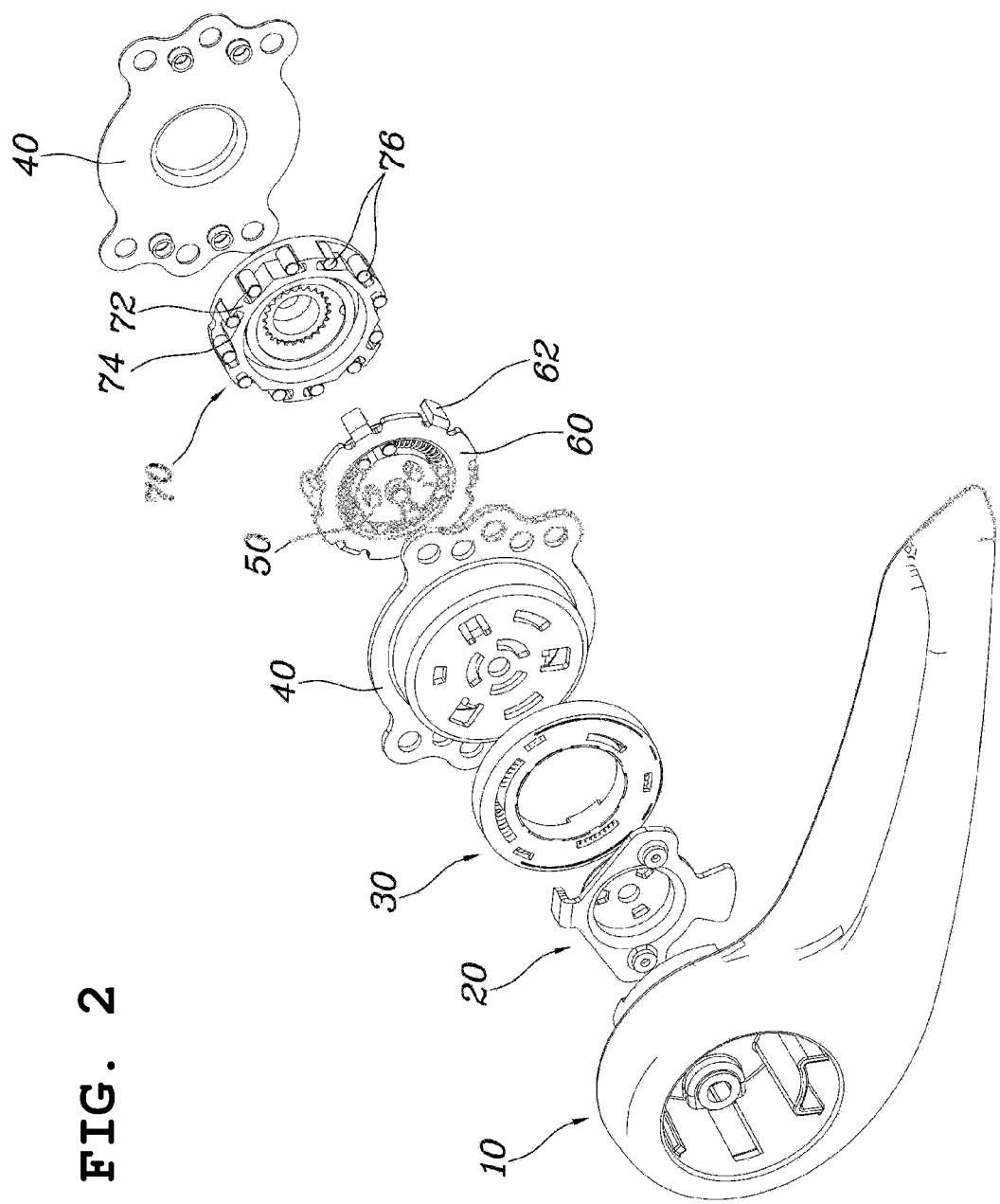
FIG. 2 is an exploded perspective view showing a pumping device for a seat of a vehicle according to an embodiment of the present invention.
Figure 3:
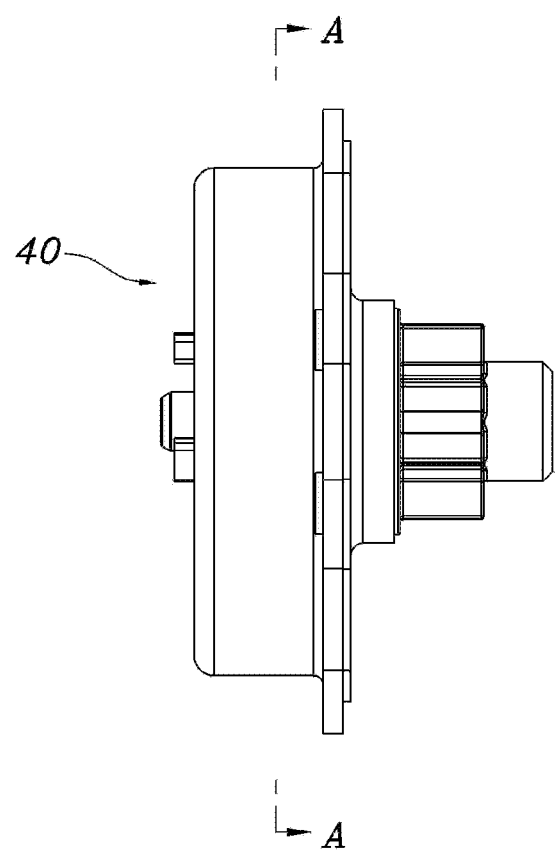
FIG. 3 is a side view showing a state where a cam mechanism, a clutch mechanism, and a brake mechanism of the present invention are assembled together.

FIG. 2 is an exploded perspective view showing a pumping device for a seat of a vehicle according to an embodiment of the present invention; FIG. 3 is a side view showing a state where a cam mechanism, a clutch mechanism, and a brake mechanism of the present invention are assembled together; and FIG. 4 is a sectional view taken along line A-A of FIG. 3.

Figure 4:
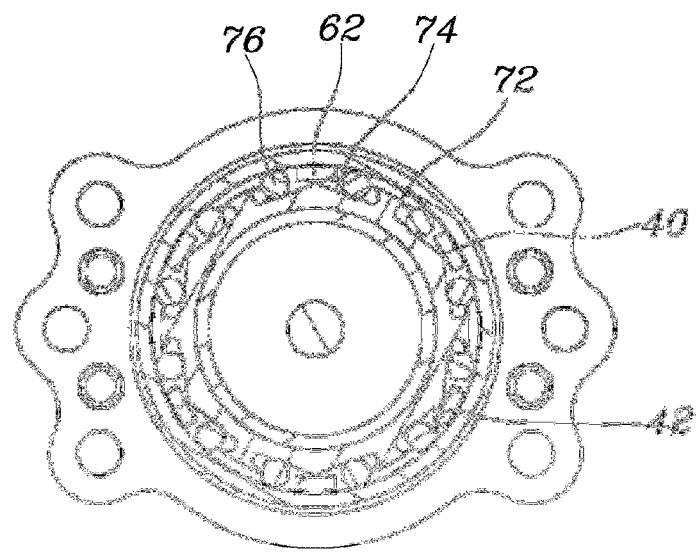
FIG. 4 is a sectional view taken along line A-A of FIG. 3.

Referring to FIGS. 2 to 4, the pumping device for a seat of a vehicle of the present invention includes: a cam mechanism 50 rotating along with a lever 10, a clutch mechanism 60 receiving power from the cam mechanism 50, a housing 40 accommodating the cam mechanism 50 and the clutch mechanism 60 therein; a brake mechanism 70 accommodated in the housing 40 to receive power from the clutch mechanism 60, and configured such that a plurality of boss portions 72 protrude along an outer circumferential surface thereof, outer end sides of the boss portions 72 face an inner circumferential surface 42 of the housing 40, and a pressing portion 62 protruding from the clutch mechanism 60 is disposed between a boss portion 72 and a neighboring boss portion 72; and a brake roller 76 provided at opposite sides of each of the boss portions 72 of the brake mechanism 70 to be disposed between the boss portion 72 and the pressing portion 62, and configured such that an outermost point thereof is disposed outward more than the outer end sides of the boss portions 72 based on a central axis of the brake mechanism 70, and the outermost point is brought into contact with the inner circumferential surface 42 of the housing 40.

The cam mechanism 50 is welded onto the lever bracket 20, and the lever 10 is coupled to the lever bracket 20, such that the cam mechanism 50 is rotated according to the manipulation of the lever 10 by a seat occupant.

Herein, a return spring mechanism 30 provided between the lever bracket 20 and the housing 40 serves to provide a restoring force to the lever bracket 20, and detailed operation thereof has been variously disclosed in the prior art, and a detailed description thereof will be omitted.

Between the outer circumferential surface of the cam mechanism 50 and the inner circumferential surface of the clutch mechanism 60, a plurality of rollers are provided, such that the power of the cam mechanism 50 is transmitted to the clutch mechanism 60 through the rollers. Since springs are provided between the plurality of rollers, the springs are compressed and restored by the moving rollers in accordance with the rotation of the cam mechanism 50 to apply the restoring force, such that the cam mechanism 50 rotated by the manipulation of the lever 10 by the seat occupant is restored to the original state thereof. This also has been variously disclosed in the prior art, and a detailed description thereof will be omitted.

The clutch mechanism 60 receiving the power from the cam mechanism 50 is rotated to transmit the power to the brake mechanism 70 through the pressing portion 62 protruding toward the brake mechanism 70 side.

The brake mechanism 70 is provided with T-shaped boss portions 72 protruding toward the radial direction along the outer circumferential surface thereof, so as to hold the brake rollers 76 to be described later by being brought in contact with the brake rollers 76 or transfer power by pressing the same.

The brake roller 76 is provided between the pressing portion 62 of the clutch mechanism 60 and the boss portion 72 of the brake mechanism 70, and is moved along the outer circumferential surface of the brake mechanism 70 by being pressed by the pressing portion 62 according to the rotation of the clutch mechanism 60. As a result, as the boss portion 72 is circumferentially pushed by the moving brake roller 76, the brake mechanism 70 rotates.

Since the above described cam mechanism 50, clutch mechanism 60, and brake mechanism 70 are not provided to be perfectly fixed to each other, the respective axes are displaced by the tolerance or external impact generated in the manufacturing process, so a frictional force may be generated as the boss portion 72 of the brake mechanism 70 is brought into contact with the inner circumferential surface 42 of the housing 40.

This not only causes the seat occupant inconvenience in operating the pumping device lever, but also leads to a decrease in durability of the brake mechanism 70.

Accordingly, the present invention is configured such that the outermost point of the brake roller 76 is disposed outward more than the outer end side of the boss portion 72 based on a central axis of the brake mechanism 70. Here, the outermost point of the brake roller 76 is provided to be in contact with the inner circumferential surface 42 of the housing 40.

To be more specific, when the brake roller 76 is pressed by the pressing portion 62 or is moved along the outer circumferential surface of the brake mechanism 70 by being pressed by the boss portion 72, the outermost point of the brake roller 76 may be configured to be always brought into contact with the inner circumferential surface 42 of the housing 40, and the outermost point of the boss portion 72 may be configured to maintain a gap with the inner circumferential surface 42 of the housing 40.

To achieve this, as shown in FIG. 4, the boss portion 72 may be formed to have a protruding height from the outer circumferential surface of the brake mechanism 70 smaller than a diameter of the brake roller 76. On the other hand, the brake roller 76 may be formed to have a diameter larger than the protruding height of the boss portion 72 from the outer circumferential surface of the brake mechanism 70.

Accordingly, the brake roller 76 is provided to be into contact with the inner circumferential surface 42 of the housing 40, whereby the outermost point of the boss portion 72 of the brake mechanism 70 having a smaller height is prevented from being into contact with the inner circumferential surface 42 of the housing 40, and thus, the boss portion 72 and the housing 40 are prevented from being into contact with each other even if a dimensional tolerance or an external impact is generated, so that friction noise can be prevented from occurring.

Meanwhile, the outer circumferential surface of the brake mechanism 70 may be provided with a plurality of inclined surfaces 74 configured to be gradually away from the central axis of the brake mechanism 70 as being gradually away with respect to the boss portions 72 in a circumferential direction, and the plurality of inclined surfaces 74 may be configured to have an angle such that in a state where the brake roller 76 is brought into contact with the inclined surface 74 and the boss portion 72, the outermost point of the brake roller is brought into contact with the inner circumferential surface 42 of the housing 40.

In other words, without varying the height of the boss portion 72 or the diameter of the brake roller 76, by adjusting the angle of the inclined surface 74, which is the outer circumferential surface of the brake mechanism 70, the outermost point of the brake roller 76 may be provided outward more than the outermost point of the boss portion 72.

Herein, the inclined surface 74 of the brake mechanism 70 is provided such that the radius of the inclined surface 74 increases as being gradually away from the opposite sides of the boss portions 72 in the circumferential direction, whereby it is possible to prevent the brake mechanism 70 from rotating due to the reverse torque transmitted from the seat side by using the brake roller 76.

Accordingly, as the angle of the inclined surface 74 of the brake mechanism 70 becomes larger, the outermost point of the brake roller 76 is further away from the center of the brake mechanism 70.

In other words, the present invention is configured such that by varying at least one of the height of the boss portion 72 of the brake mechanism 70, the diameter of the brake roller 76, and the angle of the inclined surface 74 formed on the outer circumferential surface of the brake mechanism 70, it is possible to the occurrence of friction noise, durability degradation of the brake mechanism 70, and insertion of the brake mechanism 70 into the housing 40 due to friction between the boss portion 72 of the brake mechanism 70 and the inner circumferential surface 42 of the housing 40.

According to the pumping device for a seat of a vehicle configured as described above, although dimensional tolerance is generated or the displacement between the brake mechanism and the housing is generated by the external force, the friction between the boss portion of the brake mechanism and the housing is prevented, whereby it is possible to prevent friction noise, brake mechanism insertion, and durability degradation of the brake mechanism, and ultimately, it is possible to improve the pumping device's merchantability.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pumping device for a seat of a vehicle, the pumping device comprising:
   a cam mechanism rotating along with a lever;
   a clutch mechanism receiving power from the cam mechanism;
   a housing accommodating the cam mechanism and the clutch mechanism therein;
   a brake mechanism accommodated in the housing to receive power from the clutch mechanism, and configured such that a plurality of boss portions protrude along an outer circumferential surface thereof, outer end sides of the boss portions face an inner circumferential surface of the housing, and a pressing portion protruding from the clutch mechanism is disposed between two boss portions of the plurality of boss portions; and
   a brake roller provided at opposite sides of each of the boss portions of the brake mechanism to be disposed between a boss portion of the plurality of boss portions and the pressing portion, and configured such that an outermost point thereof is disposed outward more than the outer end sides of the boss portions based on a central axis of the brake mechanism, and the outermost point is brought into contact with the inner circumferential surface of the housing.

2. The pumping device of claim 1, wherein each of the boss portions of the plurality of boss portions is configured to have a protruding height from the outer circumferential surface of the brake mechanism smaller than a diameter of the brake roller.

3. The pumping device of claim 1, wherein the brake roller is configured to have a diameter larger than a protruding height of the boss portions of the plurality of boss portions from the outer circumferential surface of the brake mechanism.

4. The pumping device of claim 1, wherein when the brake roller is pressed by the pressing portion or the boss portion of the plurality of boss portions to move along the outer circumferential surface of the brake mechanism, the outermost point of the brake roller is always brought into contact with the inner circumferential surface of the housing, and an outermost point of the boss portion maintains a gap with the inner circumferential surface of the housing.

5. The pumping device of claim 1, wherein the outer circumferential surface of the brake mechanism is provided with a plurality of inclined surfaces formed between the plurality of boss portions and a vertex formed between both inclined surfaces of the plurality of inclined surfaces is configured to be away from the central axis of the brake mechanism as being away with respect to the boss portions of the plurality of boss portions in a circumferential direction, and each of the plurality of inclined surfaces is configured to have an angle such that in a state where the brake roller is brought into contact with the inclined surface and the boss portion, the outermost point of the brake roller is brought into contact with the inner circumferential surface of the housing.

\* \* \* \* \*